(12) United States Patent
Wang

(10) Patent No.: US 10,399,175 B2
(45) Date of Patent: Sep. 3, 2019

(54) SYSTEMS AND METHODS FOR IMPROVING WELD STRENGTH

(71) Applicant: GM GLOBAL TECHNOLOGY OPERATIONS LLC, Detroit, MI (US)

(72) Inventor: Pei-Chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 802 days.

(21) Appl. No.: 14/460,796

(22) Filed: Aug. 15, 2014

(65) Prior Publication Data

US 2016/0045978 A1 Feb. 18, 2016

(51) Int. Cl.
| | |
|---|---|
| *B23K 11/20* | (2006.01) |
| *B23K 11/11* | (2006.01) |
| *B23K 11/34* | (2006.01) |
| *B23K 20/00* | (2006.01) |
| *B23K 20/10* | (2006.01) |
| *B23K 31/02* | (2006.01) |
| *B23K 11/06* | (2006.01) |
| *B23K 101/18* | (2006.01) |
| *B23K 103/20* | (2006.01) |

(52) U.S. Cl.
CPC .......... *B23K 11/20* (2013.01); *B23K 11/061* (2013.01); *B23K 11/115* (2013.01); *B23K 11/34* (2013.01); *B23K 20/002* (2013.01); *B23K 20/10* (2013.01); *B23K 31/02* (2013.01); *B23K 2101/185* (2018.08); *B23K 2103/20* (2018.08)

(58) Field of Classification Search
CPC ..... B23K 11/061; B23K 11/115; B23K 11/20; B23K 11/34; B23K 20/002; B23K 20/10; B23K 2201/185; B23K 2203/20; B23K 31/02

USPC ....................................................... 219/91.2
See application file for complete search history.

(56) References Cited

U.S. PATENT DOCUMENTS

| 1,900,161 | A | * | 3/1933 | Cohan | .................. B23K 11/115 219/91.23 |
|---|---|---|---|---|---|
| 8,651,163 | B1 | | 2/2014 | Widhalm | |
| 2013/0119035 | A1 | * | 5/2013 | Ananthanarayanan | ...................... B23K 11/115 219/130.1 |

FOREIGN PATENT DOCUMENTS

| DE | 1479511 A | 7/1969 |
|---|---|---|
| DE | 202013105468 U1 | 2/2014 |
| DE | 102013212763 | 12/2014 |

OTHER PUBLICATIONS

Translation of DE102013212763—Cited by Applicant.*
Translation of DE202013105468—Cited by Applicant.*
Translation of DE1479511—Cited by Applicant.*
German Office Action dated Nov. 7, 2016 for related German Patent Application No. 10 2015 113 452.7.
Chinese Office Action dated Mar. 27, 2017 for corresponding Chinese Patent Application No. 201510783774.0.

* cited by examiner

*Primary Examiner* — Dana Ross
*Assistant Examiner* — Joseph W Iskra
(74) *Attorney, Agent, or Firm* — Reising Ethington P.C.

(57) ABSTRACT

A method includes forming a first pocket in a first sheet of material and a second pocket in a second sheet of material, pressing the first pocket and the second pocket together at a nonlinear interface, and welding material of the first pocket and the second pocket at the interface.

8 Claims, 4 Drawing Sheets

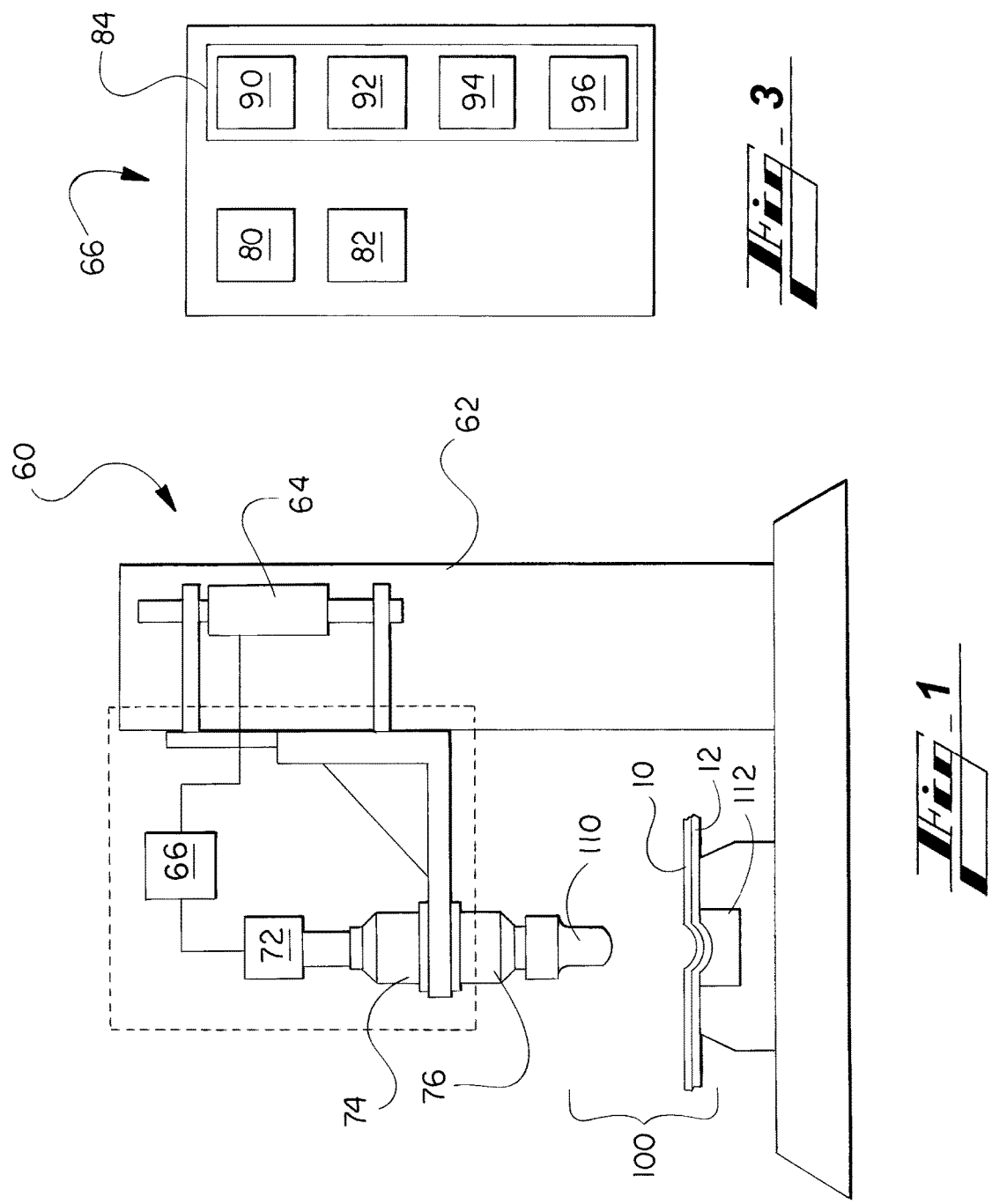

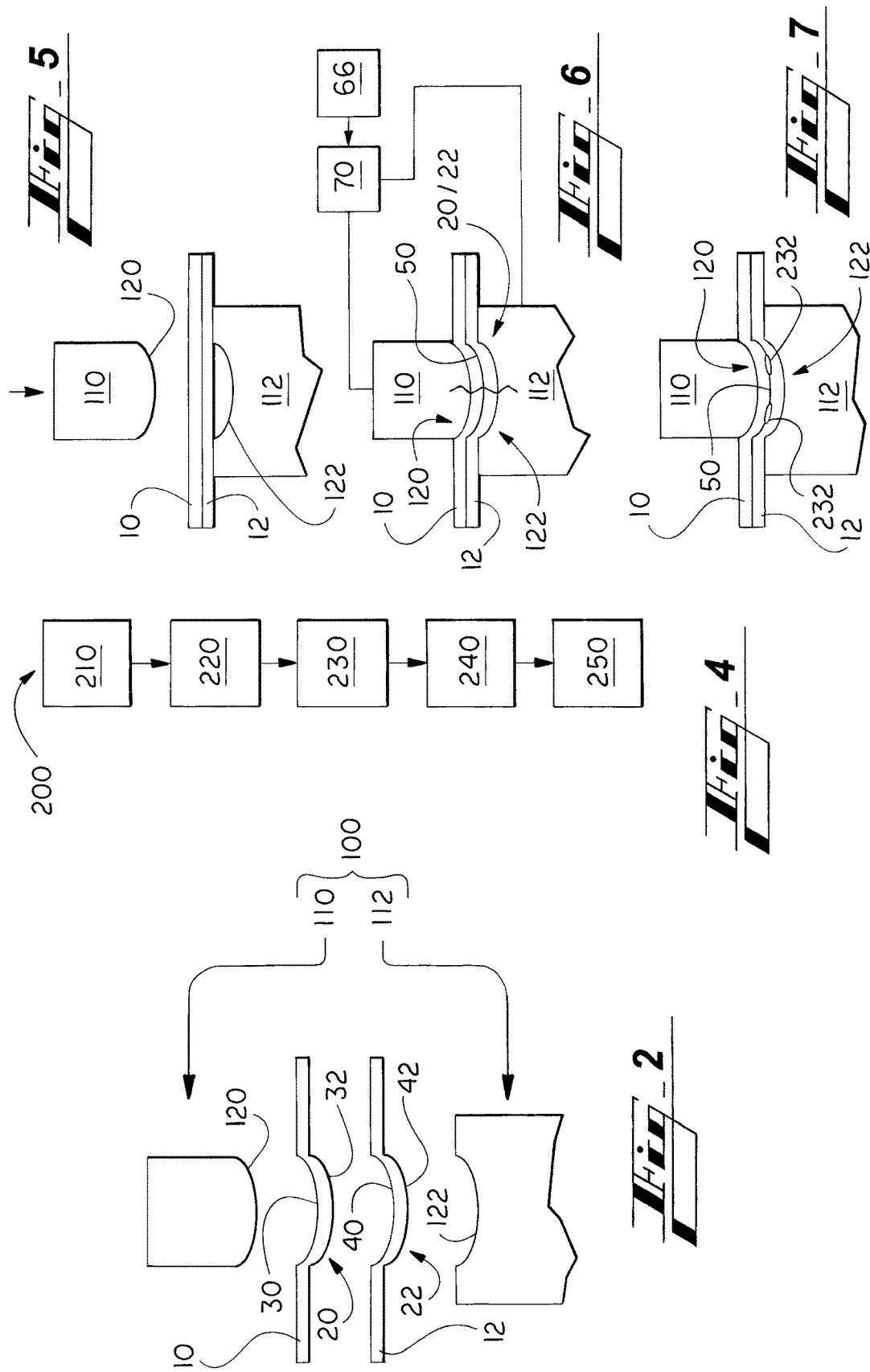

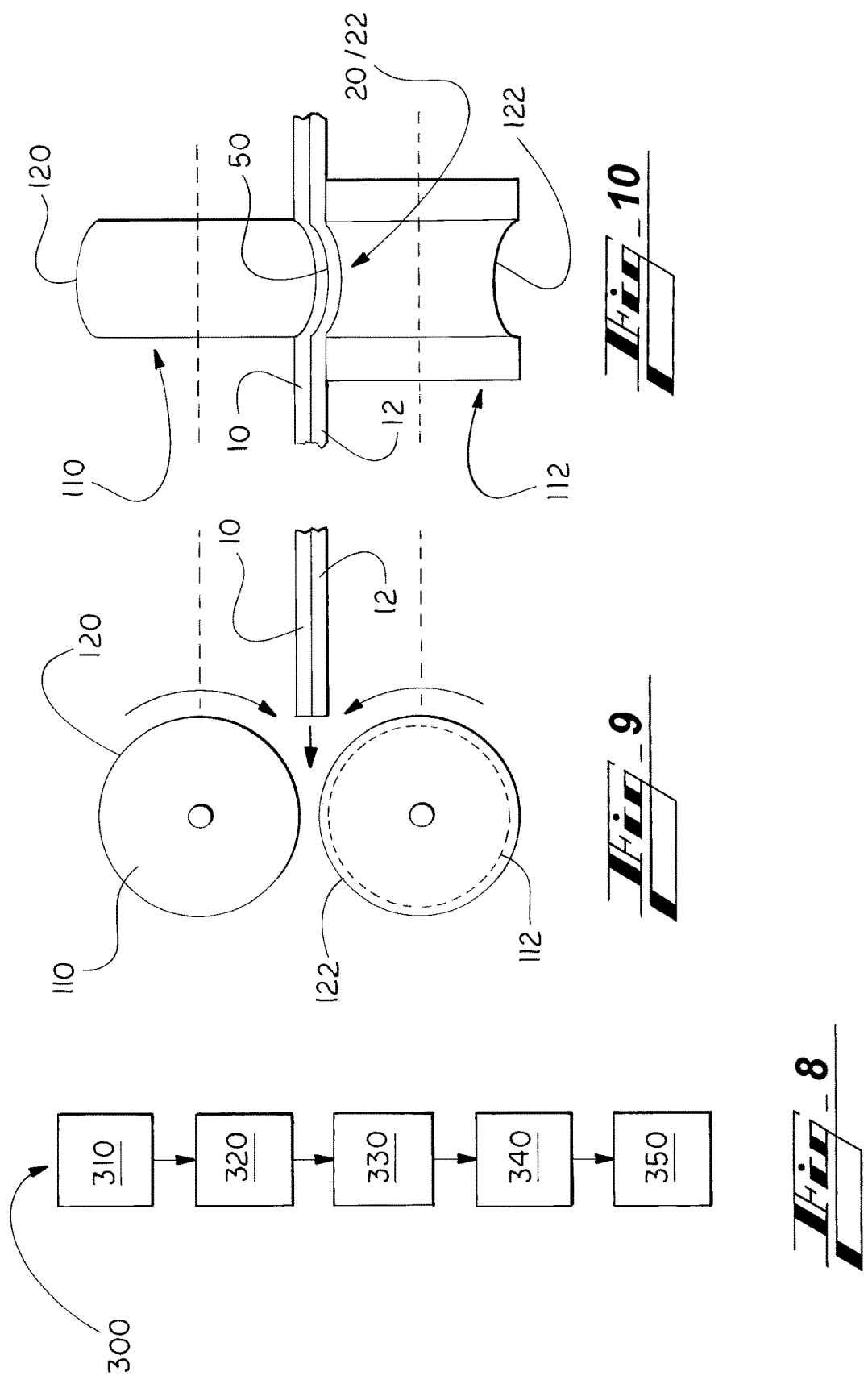

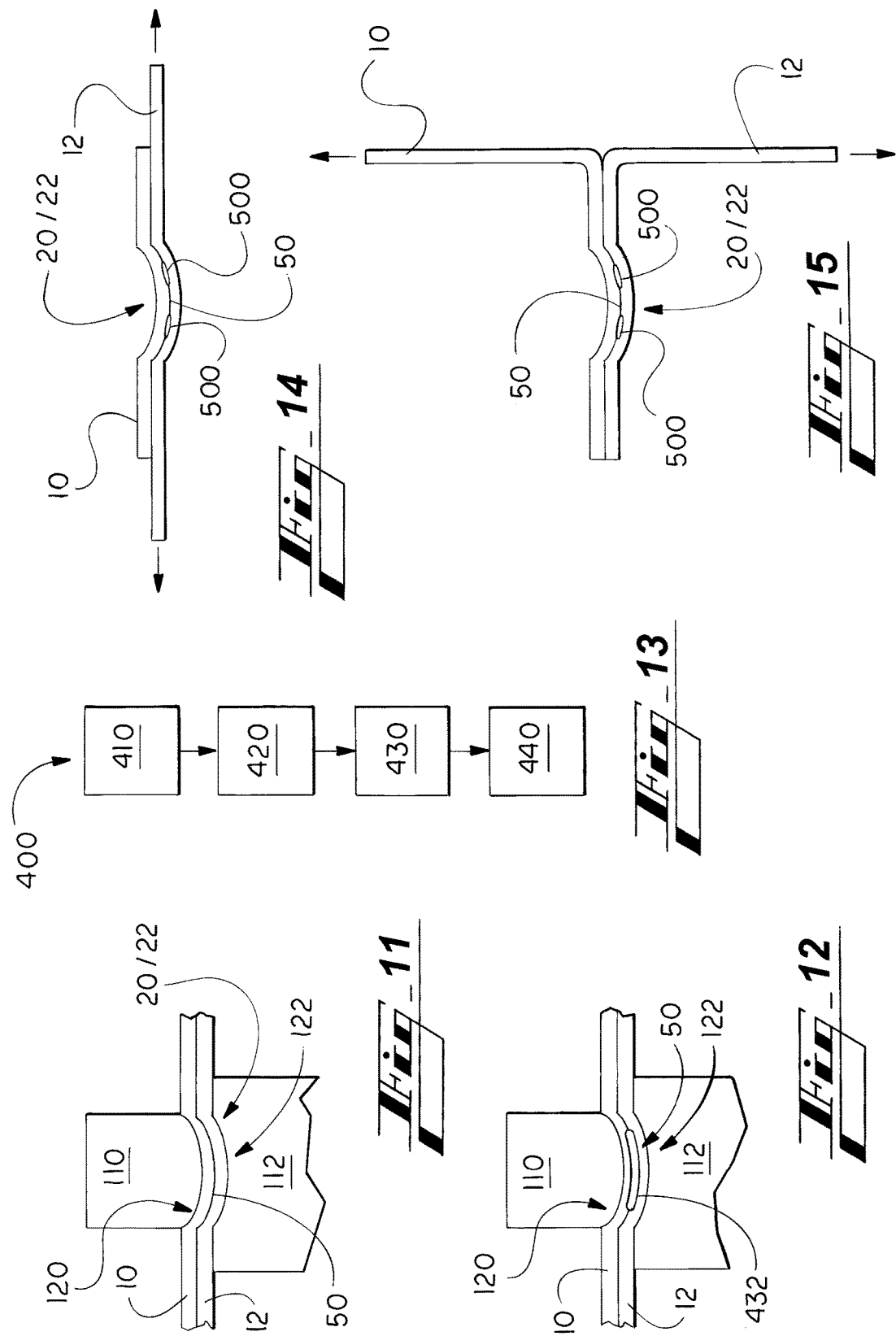

SYSTEMS AND METHODS FOR IMPROVING WELD STRENGTH

TECHNICAL FIELD

The present disclosure relates generally to systems and methods to improve weld strength.

BACKGROUND

Aluminum-to-steel welding is used extensively in the automotive industry to reduce the weight of automobiles. One of the major challenges in resistance welding aluminum to steel is the formation of weld discrepancies and intermetallic compounds at the faying interfaces. Because of the high heat transfer coefficient between workpieces and the electrodes, the heat dissipates quickly through the electrodes. This heat dissipation leads to the weld discrepancies along the faying interfaces. Weld discrepancies and intermetallic compounds limit peel weld strength.

SUMMARY

The present technology relates to systems and methods to improve weld strength. The systems and methods improve the strengths of resistance-welded aluminum-to-steel. In addition, the systems and methods are applicable to other materials and welding techniques.

An exemplary method includes forming a first pocket in a first sheet of material and a second pocket in a second sheet of material, pressing the first pocket and the second pocket together at a nonlinear interface, and welding material of the first pocket and the second pocket at the interface.

The first pocket and the second pocket are pressed between a first tooling element and a second tooling element. The first tooling element includes a convex tooling surface and the second tooling element includes a concave tooling surface. The material is melted with at least one of the first tooling element and the second tooling element and then solidifies to form a joint at the nonlinear interface.

Under a given remote loading, the welded pocket induces a local mixed-mode loading.

DESCRIPTION OF THE DRAWINGS

FIG. 1 schematically illustrates a welding system, according to an exemplary embodiment of the disclosure.

FIG. 2 schematically illustrates workpieces and tooling of the welding system of FIG. 1.

FIG. 3 schematically illustrates a control system of the welding system of FIG. 1.

FIG. 4 is a block diagram of a spot welding method, according to an exemplary embodiment of the disclosure.

FIGS. 5-7 schematically illustrate the spot welding method of FIG. 4.

FIG. 8 is a block diagram of a seam welding method, according to an exemplary embodiment of the disclosure.

FIGS. 9-10 schematically illustrate the seam welding method of FIG. 8.

FIG. 11 is a block diagram of an ultrasonic welding method, according to an exemplary embodiment of the disclosure.

FIGS. 12-13 schematically illustrates the ultrasonic welding method of FIG. 11.

FIG. 14 schematically illustrates a joint under shear loading.

FIG. 15 schematically illustrates a joint under peel loading.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The systems and methods described herein are configured to join workpieces. Although the methods described herein including resistance welding, seam welding and ultrasonic welding. However, the teachings herein can be applied to other joining processes such as laser, arc, and the like.

Exemplary workpieces include metal sheets, other sheets of material, studs, projections, electrical wiring hangers, heat exchanger fins, and tubing. For purposes of teaching, methods of joining two sheets of material are described. However, the methods described herein can be used to join more than two sheets of material or more than two workpieces. For example, methods described herein can be applied to joining of multiple workpieces (e.g., more than two workpieces) in a stack-up.

For purposes of teaching, referring to FIGS. 1 and 2, a first workpiece 10 is a first sheet of material and a second workpiece 12 is a second sheet of material. The first workpiece 10 includes a first pocket 20 and the second workpiece includes a second pocket 22. A pocket is preformed or formed by tooling as described in further detail below. A pocket is an impression formed in a workpiece to include a concave surface and a convex surface. For example, a pocket may be a dent, a groove, and the like.

The first pocket 20 includes a first concave surface 30 and a first convex surface 32. The second pocket 22 includes a second concave surface 40 and a second convex surface 42. The concave and convex surfaces of each pocket are opposed surfaces. For example, the opposed surfaces may be referred to as an inner surface and an outer surface.

The first pocket 20 nests in the second pocket 22 such that the first convex surface 32 substantially contacts the second concave surface 40. The first convex surface 32 and the second concave surface 40 define an interface 50 (e.g., see FIGS. 14 and 15) between the first pocket 20 and the second pocket 22.

The methods herein can be advantageously applied to join materials that have brittle material properties (e.g. welded high strength steels, welded aluminum-steel, joined polymeric materials). The methods can also be applied to other materials to improve the strength of a joint.

Continuing with FIG. 1, a welding system 60 is configured to perform the methods described herein.

According to an exemplary embodiment, the welding system 60 includes a welding press 62 that is configured to press workpieces 10, 12 together between tooling 100, described in further detail below.

According to an exemplary embodiment, the welding press 62 includes a pneumatic system 64 or a servo system that is configured to move the tooling 100 to press the workpieces 10, 12 together. The welding press 62 is configured to be controlled by a control system 66.

According to an exemplary embodiment, momentarily referring to FIG. 6 where the tooling 100 includes electrodes, the welding system 60 includes a power supply 70 that is configured to supply power to generate a current through the electrodes. The control system 66 is configured control the power supply 70.

According to an exemplary embodiment, referring again to FIG. 1, where the tooling includes a horn and an anvil, the system includes a transducer 72 and boosters 74, 76 that are configured to generate a high frequency vibration that is applied by the horn. The control system 66 is configured to generate and send an electrical signal to the transducer 72. The transducer 72 is configured to convert the electrical signal to a mechanical vibration and the boosters 74, 76 are configured to amplify the mechanical vibration.

Referring to FIG. 3, the control system 66 includes a processor 80 for controlling and/or processing data, input/output data ports 82, and a memory 84.

The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The control system 66 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the control unit 66.

While the memory 84 is illustrated as residing proximate the processor 80, it should be understood that at least a portion of the memory can be a remotely accessed storage system, for example, a server on a communication network, a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 84 includes several categories of software and data used in the control system 66, including applications 90, a database 92, an operating system 94, and input/output device drivers 96.

As will be appreciated by those skilled in the art, the operating system 94 may be any operating system for use with a data processing system. The input/output device drivers 96 may include various routines accessed through the operating system 94 by the applications to communicate with devices, and certain memory components. The applications 90 can be stored in the memory 84 and/or in a firmware (not shown) as executable instructions, and can be executed by the processor 80.

The applications 90 include various programs that, when executed by the processor 80, implement the various features of the control system 66. The applications 90 include applications for performing the methods described herein. The applications 90 are stored in the memory 84 and are configured to be executed by the processor 80.

The applications 90 may use data stored in the database 92, such as that which is received via the input/output data ports 82. The database 92 includes static and/or dynamic data used by the applications 90, the operating system 94, the input/output device drivers 96 and other software programs that may reside in the memory 84.

It should be understood that FIG. 3 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 3.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, mini-computers, mainframe computers, personal computers, hand-held computing devices, microprocessor-based, programmable consumer electronics, combinations thereof, and the like.

Continuing with FIGS. 1 and 2, tooling 100 includes a first tooling element 110 and a second tooling element 112. The first tooling element 110 and the second tooling element 112 have complementary geometry. For example, the shapes of surfaces are complementary or cross sections of the surfaces are complementary.

The first tooling element 110 includes an outwardly-protruding convex geometry and the second tooling element 112 includes a hollowed-in convex geometry. The first tooling element 110 includes a convex tooling surface 120 and the second tooling element 112 includes a concave tooling surface 122. In the case of spot welding, the first tooling element 110 is a probe-shaped electrode with a convex tooling surface 120 that is hemi-spherical; and the second tooling element 112 is a cup-shaped electrode with a concave tooling surface 122 that is a hemi-spherical.

Similarly, in the case of seam welding, the first tooling element 110 is a wheel that includes a convex tooling surface 120 (e.g., round) and the second tooling element 112 is a wheel with a trough or channel with a concave tooling surface 122 (e.g., rounded or hemi-cylindrical).

The first tooling element 110 and the second tooling element 112 can have various other complementary geometries to facilitate welding the workpieces 10, 12 together at the interface 50 as described in further detail below. For example, the geometry can be cube-shaped, pyramid shaped, and the like. The cross section can be part of an oval, square, triangle parabola, and the like.

The first tooling element 110 and the second tooling element 112 are configured to come together to apply a force and the geometry of the first tooling element 110 and the second tooling element 112 corresponds to the geometry of the first pocket 20 and the second pocket 22. Particularly, the first tooling element 110 is configured to be received in the first pocket 20 such that the convex tooling surface 120 applies a force to the first concave surface 30; and the second tooling element 112 is configured to receive the second pocket 22 such that the concave tooling surface 122 applies a force to the second convex surface 42.

The first tooling element 110 and the second tooling element 112 press the first workpiece 10 and the second workpiece 12 together at the interface 50 where a weld is to be created. Particularly, the first tooling element 110 and the second tooling element 112 press the first convex surface 32 of the first pocket 20 against the second concave surface 40 of the second pocket 22.

The first tooling element 110 and the second tooling element 112 are further configured to generate heat at the interface 50 to create a weld at the interface 50 as described in further detail below. Because the interface 50 is nonlinear, the weld creates mixed-mode loading that improves the strengths of the joint (e.g., lap, peel, cross-tension strengths). The weld may be created along part of the interface (e.g., a doughnut or annular weld) or, along the entire interface.

According to electric resistance welding methods 200, 300, electric resistance welding is used to join the first workpiece 10 and the second workpiece 12. Electric resistance welding includes welding processes such as spot welding, seam welding and high frequency welding. Electric resistance welding coalesces faying (e.g., overlapping, contacting) surfaces 32, 40 (i.e., interface 50) of the workpieces 10, 12.

For purposes of teaching, each of the first tooling element 110 and the second tooling element 112 is a copper electrode (e.g., the tooling 100 is die-electrode tooling); and each of the first workpiece 10 and the second workpiece 12 is a metal sheet. For example, the first metal sheet 10 is aluminum and the second metal sheet 12 is ultra-high strength steel.

The first electrode 110 and the second electrode 112 are configured to come together to clamp the first metal sheet 10 and the second metal sheet 12 together; and to form the first pocket 20 in the first metal sheet 10 and the second pocket 22 in the second metal sheet 12.

The first electrode 110 and the second electrode 112 are further configured to pass welding current through the clamped first metal sheet 10 and the second metal sheet 12. Due to the electric resistance of the first metal sheet 10 and the second metal sheet 12, the current creates a weld at the interface 50 as described in further detail below. Because the weld is along the nonlinear interface 50, the local loading under a given remote loading (see FIGS. 14 and 15) is mixed-mode loading (e.g., peel-shear loading).

Referring to FIGS. 4 and 5, according to a first block 210 of the spot welding method 200, the first metal sheet 10 and the second metal sheet 12 are overlapped at a desired welding location and positioned between the first electrode 110 and the second electrode 112.

Referring to FIGS. 4-6, according to a second block 220, the first electrode 110 and the second electrode 112 are brought together. The convex tooling surface 120 of the first electrode 110 presses the first metal sheet 10 and the second metal sheet 12 into the concave tooling surface 122 of the second electrode 112 thereby forming the first pocket 20 and the second pocket 22. The first electrode 110 and the second electrode 112 continue to apply a force to maintain contact between the first electrode 110, the first pocket 20, the second pocket 22, and the second electrode 112. Particularly, the first pocket 20 and the second pocket 22 are in contact at the interface 50.

Referring to FIGS. 4 and 6, according to a third block 230, the tooling 100 generates a current that flows between the first electrode 110 and the second electrode 112, and thereby flows through the first metal sheet 10 and the second metal sheet 12. For example, the electrical current is in the range of 1-100,000 Amperes. The current used is a calculation based on gage or thickness of the first metal sheet 10 and the second metal sheet 12. Resistance spot welding typically employs electrical power in the form of direct current, alternating current, medium frequency half-wave direct current, or high-frequency half wave direct current.

Referring to FIGS. 4 and 7, according to a fourth block 240, the current through the first metal sheet 10 and the second metal sheet 12 generates heat at the interface 50 (i.e., where the workpieces 10, 12 overlap one another). The electrical resistance of the first metal sheet 10 and the second metal sheet 12 causes heat to build up. The rising temperature causes a rising resistance and results in molten pools 232 of metal at the interface 50 (e.g., the connecting or "faying" surfaces, which is the point of most electrical resistance).

The heat generated is a function of the amount of current, the force applied by the electrodes, the time that the current/force is applied, and the electrical resistance of the materials, the proportions of the workpieces, the metal coating or the lack of coating, the material of the electrodes, and the geometry of the electrodes.

According to a fifth block 250, the tooling 100 ceases to generate the current and the first electrodes 110 and the second electrode 112 are cooled (e.g., water cooled) to solidify the molten metal 232. For example, the first electrode 110 and the second electrode 112 quickly remove heat from the surface of the molten metal 232 to accelerate the solidification of the metal. For example, copper is an excellent conductor that facilitates removing heat from the molten metal. The electrodes 110, 112 are removed and the metal sheets 10, 12 are connected by weld connections 232 (referred to as a joint and described in further detail below).

Generally, the spot welding method 200 creates a bond (e.g., resistance welding bonds include solid state, fusion, and reflow braze). In a fusion bond, either similar or dissimilar materials with similar grain structures are heated to the melting point (liquid state) of both. The subsequent cooling and combination of the materials forms a "weld nugget" that has different microstructures from the base materials.

Referring to FIG. 8, according to a seam welding method 300, resistance seam welding is used to join the first metal sheet 10 and the second metal sheet 12. Like the spot welding method 200, the tooling 100 includes the first electrode 110 and the second electrode 112 (e.g., made from copper) that apply pressure and current. However, here, each of the first electrode 110 and the second electrode 112 is disc-shaped. The first electrode 110 and the second electrode 112 rotate. The first metal sheet 10 and the second metal sheet 12 are overlapped and fed between the rotating first electrode 110 and second electrode 112.

Referring to FIGS. 8 and 9, according to a first block 310, the first metal sheet 10 and the second metal sheet 12 are overlapped at a desired welding seam and positioned to be fed between the first electrode 110 and the second electrode 112.

Referring to FIGS. 8-10, according to a second block 320, the first metal sheet 10 and the second metal sheet 12 are fed between the first electrode 110 and the second electrode 112. The first electrode 110 and the second electrode 112 are positioned with respect to one another such that, as the first metal sheet 10 and the second metal sheet 12 are fed between the first electrode 110 and the second electrode 112, the convex tooling surface 120 of the first electrode 110 presses the first metal sheet 10 and the second metal sheet 12 into the concave tooling surface 122 of the second electrode 112 thereby forming the first pocket 20 and the second pocket 22. The electrodes may also move or assist the movement of the metal sheets.

According to a third block 330, at substantially the same time of the second block 320 (e.g., right after the first pocket 20 and the second pocket 22 is formed), the tooling 100 generates a current that flows between the first electrode 110 and the second electrode 112, and thereby flows through the first metal sheet 10 and the second metal sheet 12. The current is generated as the first electrode 110 and the second electrode 112 continue to apply a force to maintain contact between the first electrode 110, the first pocket 20, the second pocket 22, and the second electrode 112. Particularly, the first pocket 20 and the second pocket 22 are in contact at the interface 50.

According to a fourth block 340, the current through the first metal sheet 10 and the second metal sheet 12 generates heat at the interface 50 (i.e., where the workpieces 10, 12 overlap one another). The heat forms pools of molten metal at the interface 50 (e.g., the connecting or "faying" surfaces, which is the point of most electrical resistance). Particularly, the electrical resistance of the first metal sheet 10 and the second metal sheet 12 causes heat to build up. The rising temperature causes a rising resistance and results in a molten pool of metal. The semi-molten surfaces are pressed together by the first electrode 110 and the second electrode 112 to create a fusion bond at the interface 50.

According to a fifth block 350, the tooling 100 ceases to generate the current and the first electrodes 110 and the second electrode 112 are cooled to solidify the molten metal and form a joint. For example, the tooling 100 uses water cooling through the first electrode 110 and the second electrode 112.

Referring to FIG. 11, according to an ultrasonic welding method 400, ultrasonic welding is used to join the first workpiece 10 and the second workpiece 12. According to the ultrasonic welding method 400, high-frequency ultrasonic acoustic vibrations are locally applied to the first workpiece 10 and the second workpiece 12, which are held together under pressure, to create a solid-state (for metal) or fusion (for polymer) weld. Particularly, ultrasonic welding joins faying (e.g., overlapping, contacting) surfaces 32, 40 (i.e., interface 50) of the workpieces 10, 12. For example, for metal, a solid-state weld is produced by horizontal vibration of the first tooling element 110 (e.g., a horn) and, for polymer materials, fusion is created is created by vertical vibration of the first tooling element 110.

Ultrasonic welding is applicable to workpieces 10, 12 made of materials including polymeric composites, plastics (e.g., both hard and soft plastics such as semicrystalline plastics), Carbon-fiber-reinforced polymer (CFRP) sheets and metals (e.g., thin, malleable metals such as aluminum, copper, and nickel).

For purposes of teaching, the first tooling element 110 is a sonotrode (also referred to as a horn) and the second tooling element 112 is a nest (also referred to as an anvil); and each of the first workpiece 10 and the second workpiece 12 is a polymeric composite sheet. The sonotrode 110 includes is vibrated by the transducer 72 that converts electricity into mechanical vibration.

The nest 112 and the sonotrode 110 are configured to come together to press the first polymeric composite sheet 10 and the second polymeric composite sheet 12 together at the interface 50.

The first pocket 20 is preformed in the first polymeric composite sheet 10 and the second pocket 22 is preformed in the second polymeric composite sheet 12.

The sonotrode 110 is configured to apply high-frequency ultrasonic acoustic vibrations through the pressed first polymeric composite sheet 10 and the second polymeric composite sheet 12. The high-frequency ultrasonic acoustic vibrations create a weld at the interface 50 as described in further detail below. Because the weld is along the nonlinear interface 50, the local loading under a given remote loading is mixed-mode loading (e.g., peel-shear loading).

Referring to FIG. 11, according to a first block 410 of the ultrasonic welding method 400, the first polymeric composite sheet 10 is preformed with the pocket 20 and the second polymeric composite sheet 12 is preformed with the pocket 22. For example, the pockets 20, 22 are formed during a compression molding process by which the polymeric composite sheets 10, 12 are formed.

The first polymeric composite sheet 10 and the second polymeric composite sheet 12 are overlapped such that pockets 20, 22 overlap. Particularly, the first convex surface 32 of the first pocket 20 is positioned against the second concave surface 40 of the second pocket 22 (i.e., at the interface 50).

The overlapping pockets 20, 22 are positioned in the nest 112 and in between the sonotrode 110 and the nest 112. Particularly, the second convex surface 42 is positioned against the concave tooling surface 122 of the nest 112.

Referring to FIGS. 11 and 12, according to a second block 420, the nest 112 and the sonotrode 110 are brought together to press the first polymeric composite sheet 10 and the second polymeric composite sheet 12 together at the interface 50. The convex tooling surface 120 of the sonotrode 110 contacts the first concave surface 30 of the first polymeric composite sheet 10.

Referring to FIGS. 11-13, according to a third block 430, the sonotrode 110 emits a low-amplitude acoustic vibration (e.g., common frequencies used in ultrasonic welding are 15 kHz, 20 kHz, 30 kHz, 35 kHz, 40 kHz and 70 kHz). The heat (i.e., heat from friction between the workpieces, and intermolecular vibration) from ultrasonic vibration melts material 432 of the first polymeric composite sheet 10 and of the second polymeric composite sheet 12 at the interface 50 (i.e., at a point of contact between the workpieces 10, 12). Ultrasonic welding causes local melting of the material 432 due to absorption of vibrational energy. The vibrations are introduced across the interface 50 (e.g., the joint to be welded).

According to a fourth block 440, the transducer 72 ceases to emit a vibration and the material 432 at the interface 50 solidifies to create a joint.

Referring to FIGS. 14 and 15, a joint 500 is created between the first workpiece 10 and the second workpiece 12, for example, according to one of the methods described herein. The joint 500 is created along the nonlinear interface 50 between the first pocket 20 and the second pocket 22. FIG. 14 illustrates remote loading that is shear loading (e.g., in a plane of the workpieces 10, 12). FIG. 15 illustrates remote loading that is peel loading (e.g., perpendicular to the plane of the workpieces 10, 12).

Because the joint 500 is created along the nonlinear interface 50, each of the shear loading of FIG. 14 and the peel loading of FIG. 14 results in local mixed peel-shear loading at the joint 500. By inducing mixed mode (peel-shear) loading, the stresses at the joint 500 are more evenly distributed, creating a stronger joint. For example, the joint 500 distributes the stresses that are usually present in a conventional flat surface joint under peel loading more like that of a joint under shear loading.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   prior to melting a first sheet of material and a second sheet of material to form a joint, forming a first pocket in the first sheet of material and a second pocket in the second sheet of material;
   wherein the first pocket is positioned in the second pocket such that a first convex surface of the first pocket and a second concave surface of the second pocket are directly in contact at a nonlinear interface between the first convex surface and the second concave surface of the first pocket and the second pocket, respectively; and
   after the first convex surface and the second concave surface are directly in contact at the nonlinear interface, forming a joint at the nonlinear interface, comprising:
      pressing the first pocket and the second pocket together at the nonlinear interface, wherein the first pocket and the second pocket are pressed between a first tooling element and a second tooling element, wherein the first tooling element includes a convex tooling surface received in the first pocket and the second tooling element includes a concave tooling surface that receives the second pocket;
      heating the nonlinear interface to form molten pools of metal at the nonlinear interface, wherein the nonlinear interface is heated using the first tooling element and the second tooling element, and, following the heating, the molten pools of metal solidifying to form the joint at the nonlinear interface; and
      removing the first tooling element and the second tooling element from the first pocket of the first sheet of material and the second pocket of the second sheet of material, respectively, after the molten pools of metal have solidified to form the joint at the nonlinear interface.

2. The method of claim 1, the first pocket further comprising a first concave surface that receives the convex tooling surface of the first tooling element, the second pocket further comprising a second convex surface that is received by the concave tooling surface of the second tooling element.

3. The method of claim 2, the pressing including directly contacting the first concave surface with the convex tooling surface of the first tooling element and directly contacting the second convex surface with the concave tooling surface of the second tooling element.

4. The method of claim 1, wherein the first pocket and the second pocket are formed using the first tooling element and the second tooling element.

5. The method of claim 4, the forming of the first pocket in the first sheet of material and the second pocket in a second sheet of material comprising:
   overlapping the first sheet of material and the second sheet of material;
   positioning the first sheet of material and the second sheet of material between the first tooling element and the second tooling element; and
   bringing the first tooling element and the second tooling element together to form the first pocket and the second pocket.

6. The method of claim 4, the forming of the first pocket in the first sheet of material and the second pocket in a second sheet of material comprising:
   overlapping the first sheet of material and the second sheet of material;
   rotating the first tooling element and the second tooling element; and
   feeding the first sheet of material and the second sheet of material between the first tooling element and the second tooling element to form the first pocket and the second pocket.

7. The method of claim 1, wherein at least one of the first tooling element and the second tooling element is an electrode, and the heating includes passing a current through the first sheet of material and the second sheet of material.

8. The method of claim 1, wherein the forming the first pocket and the second pocket are performed as part of a process of forming the first sheet of material and the second sheet of material.

* * * * *